United States Patent
Kintrup et al.

(10) Patent No.: US 9,163,318 B2
(45) Date of Patent: Oct. 20, 2015

(54) OXYGEN-CONSUMING ELECTRODE AND PROCESS FOR PRODUCTION THEREOF

(71) Applicant: Bayer Intellectual Property GmbH, Monheim (DE)

(72) Inventors: Jürgen Kintrup, Leverkusen (DE); Andreas Bulan, Langenfeld (DE)

(73) Assignee: Bayer Intellectual Property GmbH, Monheim (DE)

( * ) Notice: Subject to any disclaimer, the term of this patent is extended or adjusted under 35 U.S.C. 154(b) by 231 days.

(21) Appl. No.: 13/625,078

(22) Filed: Sep. 24, 2012

(65) Prior Publication Data

US 2013/0075249 A1 Mar. 28, 2013

(30) Foreign Application Priority Data

Sep. 23, 2011 (DE) .......................... 10 2011 083 321

(51) Int. Cl.

| | |
|---|---|
| *B01J 23/50* | (2006.01) |
| *H01M 4/00* | (2006.01) |
| *H01M 4/04* | (2006.01) |
| *H01M 4/13* | (2010.01) |
| *H01M 4/34* | (2006.01) |
| *H01M 4/54* | (2006.01) |
| *H01M 10/32* | (2006.01) |
| *B01F 11/00* | (2006.01) |
| *C25B 11/03* | (2006.01) |
| *C25B 11/04* | (2006.01) |
| *C25B 1/46* | (2006.01) |
| *H01M 8/08* | (2006.01) |
| *H01M 4/88* | (2006.01) |
| *H01M 4/90* | (2006.01) |
| *C02F 1/461* | (2006.01) |
| *C02F 1/467* | (2006.01) |
| *H01M 4/86* | (2006.01) |

(52) U.S. Cl.
CPC ................. *C25B 11/035* (2013.01); *C25B 1/46* (2013.01); *C25B 11/0478* (2013.01); *C25B 11/0489* (2013.01); *H01M 4/8807* (2013.01); *H01M 4/9041* (2013.01); *H01M 8/083* (2013.01); *C02F 1/4674* (2013.01); *C02F 1/46109* (2013.01); *C02F 2001/46133* (2013.01); *H01M 4/886* (2013.01); *H01M 4/8896* (2013.01); *H01M 2004/8689* (2013.01); *H01M 2250/00* (2013.01); *Y02E 60/50* (2013.01)

(58) Field of Classification Search
CPC ........... B01J 23/50; H01M 4/00; H01M 4/04; H01M 4/13; H01M 4/34; H01M 4/54; H01M 10/32; B01F 11/00
USPC .................. 502/101, 184, 347; 429/219, 318; 366/22, 241
See application file for complete search history.

(56) References Cited

U.S. PATENT DOCUMENTS

| | | | |
|---|---|---|---|
| 3,843,491 A * | 10/1974 | Piro et al. ......................... | 205/74 |
| 7,771,872 B2 | 8/2010 | Tanoue et al. | |
| 2003/0190562 A1* | 10/2003 | Ikari et al. ..................... | 430/569 |
| 2004/0182695 A1* | 9/2004 | Bulan et al. ................... | 204/284 |
| 2005/0050990 A1 | 3/2005 | Harigae et al. | |
| 2005/0266311 A1* | 12/2005 | Tanoue et al. ................. | 429/219 |
| 2006/0263232 A1 | 11/2006 | Bulan | |
| 2007/0228334 A1 | 10/2007 | Goia et al. | |
| 2009/0035615 A1* | 2/2009 | Urgeghe et al. ................. | 429/13 |
| 2010/0167051 A1 | 7/2010 | Goia et al. | |
| 2012/0021302 A1* | 1/2012 | Bulan et al. ................... | 429/405 |
| 2012/0052402 A1* | 3/2012 | Turek et al. ................... | 429/405 |
| 2012/0141888 A1* | 6/2012 | Bulan et al. ................... | 429/405 |
| 2012/0145538 A1* | 6/2012 | Bulan et al. ................... | 204/242 |

FOREIGN PATENT DOCUMENTS

| | | | | |
|---|---|---|---|---|
| DE | 31 25 892 C1 | 10/1982 | | |
| DE | 10148599 A1 | 4/2003 | | |
| EP | 1574598 A1 | 9/2005 | | |
| EP | 1728896 B1 | 1/2012 | | |
| EP | 2 573 213 A1 * | 9/2012 | ............. | C25B 11/03 |
| EP | 1574598 B1 | 4/2015 | | |

* cited by examiner

*Primary Examiner* — Patricia L Hailey

(74) *Attorney, Agent, or Firm* — Drinker Biddle & Reath LLP

(57) ABSTRACT

An oxygen-consuming electrode is described, more particularly for use in chloralkali electrolysis, comprising a novel catalyst coating, as is an electrolysis apparatus. Also described is a production process for the oxygen-consuming electrode and the use thereof in chloralkali electrolysis or fuel cell technology. The oxygen-consuming electrode comprises at least an electrically conductive support, an electrical contact site and a gas diffusion layer comprising a catalytically active component, characterized in that the coating at least one fluorinated polymer, silver in the form of silver particles and silver oxide in the form of silver oxide particles, which is produced in a selected precipitation step.

18 Claims, No Drawings

OXYGEN-CONSUMING ELECTRODE AND PROCESS FOR PRODUCTION THEREOF

CROSS-REFERENCE TO RELATED APPLICATIONS

This application claims benefit under 35 U.S.C. §§119(a)-(d) of German Patent Application No. 10 2011 083 321.8, filed Sep. 23, 2011, which is incorporated herein by reference in its entirety for all useful purposes.

BACKGROUND OF THE INVENTION

The invention relates to an oxygen-consuming electrode, more particularly for use in chloralkali electrolysis, comprising a novel catalyst coating based on silver and a finely divided silver oxide, and to an electrolysis apparatus. The invention further relates to a production process for the oxygen-consuming electrode and to the use thereof in chloralkali electrolysis or fuel cell technology.

The invention proceeds from oxygen-consuming electrodes known per se, which take the form of gas diffusion electrodes and typically comprise an electrically conductive support and a gas diffusion layer comprising a catalytically active component.

Various proposals for production and operation of the oxygen-consuming electrodes in electrolysis cells on the industrial scale are known in principle from the prior art. The basic idea is to replace the hydrogen-evolving cathode in the electrolysis (for example in chloralkali electrolysis) with the oxygen-consuming electrode (cathode). An overview of the possible cell designs and solutions can be found in the publication by Moussallem et al "Chlor-Alkali Electrolysis with Oxygen Depolarized Cathodes: History, Present Status and Future Prospects", J. Appl. Electrochem. 38 (2008) 1177-1194.

The oxygen-consuming electrode—also called OCE for short hereinafter—has to meet a series of requirements to be usable in industrial electrolysers. For instance, the catalyst and all other materials used have to be chemically stable towards approx. 32% by weight sodium hydroxide solution and towards pure oxygen at a temperature of typically 80 to 90° C. Similarly, a high degree of mechanical stability is required, since the electrodes can be installed and operated in electrolysers with a size typically more than 2 m$^2$ in area (industrial scale). Further properties are: high electrical conductivity, low layer thickness, high internal surface area and high electrochemical activity of the electrocatalyst. Suitable hydrophobic and hydrophilic pores and a corresponding pore structure for conduction of gas and electrolyte are likewise necessary, as is such imperviosity that gas and liquid space remain separate from one another. Long-term stability and low production costs are further particular requirements on an industrially usable oxygen-consuming electrode.

An oxygen-consuming electrode consists typically of a support element, for example a plate of porous metal or metal wire mesh, and an electrochemically active coating. The electrochemically active coating is microporous and consists of hydrophilic and hydrophobic constituents. The hydrophobic constituents make it difficult for electrolytes to penetrate and thus keep the corresponding pores unblocked for the transport of the oxygen to the catalytically active sites. The hydrophilic constituents enable the electrolyte to penetrate to the catalytically active sites, and the hydroxide ions to be transported away. The hydrophobic component used is generally a fluorinated polymer such as polytetrafluoroethylene (PTFE), which additionally serves as a polymeric binder of the catalyst. In the case of electrodes with a silver catalyst, the silver serves as a hydrophilic component. In the case of carbon-supported catalysts, the support used is a carbon with hydrophilic pores, through which liquid can be transported.

The oxygen is reduced in a three-phase region, in which gas phase, liquid phase and solid catalyst are in contact.

The gas is transported through the pores in the hydrophobic matrix. The hydrophilic pores fill up with liquid; the water is transported to the catalytic sites and the hydroxide ions away from them through these pores. Since oxygen dissolves in the aqueous phase only to a limited degree, sufficient water-free pores must be available for transport of the oxygen.

A multitude of compounds have been described as catalysts for the reduction of oxygen.

For instance, there are reports of the use of palladium, ruthenium, gold, nickel, oxides and sulphides of transition metals, metal porphyrins and phthalocyanines, and perovskites as catalysts for oxygen-consuming electrodes.

However, only platinum and silver have gained practical significance as catalysts for the reduction of oxygen in alkaline solutions.

Platinum has a very high catalytic activity for the reduction of oxygen. Due to the high costs of platinum, it is used exclusively in supported form. A known and proven support material is carbon. Carbon conducts electrical current to the platinum catalyst. The pores in the carbon particles can be hydrophilized by oxidation of the carbon surface, and become suitable for the transport of water as a result. However, the stability of carbon-supported platinum electrodes in long-term operation is inadequate, probably because platinum also catalyses the oxidation of the support material. The oxidation of the support material leads to loss of the mechanical stability of the electrode.

Silver likewise has a high catalytic activity for the reduction of oxygen.

According to the prior art, silver can also be used with carbon as a support, and also in the form of finely divided metallic silver.

OCEs comprising carbon-supported silver typically have silver concentrations of 20-50 g/m$^2$. Even though the carbon-supported silver catalysts are fundamentally more durable than the corresponding platinum catalysts, the long-term stability thereof under the conditions of chloralkali electrolysis, however, is still limited.

It is an object of the present invention to provide an oxygen-consuming electrode (OCE), more particularly for use in chloralkali electrolysis, in which silver oxide is used, which enables a lower operating voltage when the OCEs are used in chloralkali electrolysis, and the production process for which overcomes the above-described disadvantages of the OCEs known from the prior art.

EMBODIMENTS OF THE INVENTION

An embodiment of the present invention is a process for producing an oxygen-consuming electrode, comprising the steps of:

a) precipitating silver oxide by metering a silver salt solution to an initial charge of an alkaline solution and then stirring the suspension over a period of at most 10 min, in the course of which the temperature of the suspension is kept within a range from 10° C. to 50° C., b) removing the precipitated silver oxide from step a) from the suspension, c) drying the silver oxide at a temperature in the range from 80° C. to 200° C., optionally under reduced pressure, d) further processing the resulting silver oxide with an electrically conductive support material, a catalyst comprising silver particles, and a finely divided fluorinated polymer to give a flat oxygen-consuming electrode.

Another embodiment of the present invention is the above process, wherein the silver oxide after the drying in step c) has a BET surface area in the range from 0.4 to 0.7 m$^2$/g. Another embodiment of the present invention is the above process, wherein the silver oxide after the drying in step c) has a d50 in the range from 2 to 7 µm.

Another embodiment of the present invention is the above process, wherein, in the further processing step d), 0.5 to 20 parts by weight of the fluorinated polymer, 1 to 20 parts by weight of silver in the form of silver particles, and 60 to 98.5 parts by weight of silver oxide in the form of silver oxide particles are used.

Another embodiment of the present invention is the above process, wherein, in the further processing step d), the dry production process is employed.

Another embodiment of the present invention is the above process, wherein the alkali metal hydroxide in the alkali metal hydroxide solution is used in step a) in a molar excess relative to the silver salt.

Another embodiment of the present invention is the above process, wherein the ratio of alkali metal hydroxide in the alkali metal hydroxide solution in a molar excess relative to the silver salt is at least 1.1 to 1.

Yet another embodiment of the present invention is an oxygen-consuming electrode at least comprising an electrically conductive support, an electrical contact site, and a gas diffusion layer comprising a catalytically active component, wherein the gas diffusion layer comprises at least one fluorinated polymer, silver in the form of silver particles and silver oxide in the form of silver oxide particles, produced by the above process.

Another embodiment of the present invention is the above oxygen-consuming electrode, wherein the oxygen-consuming electrode comprises silver oxide particles having a d90 of less than 13 µm.

Yet another embodiment of the present invention is an electrolysis cell for the electrolysis of an alkali metal chlorides, wherein the electrolysis cell comprises the oxygen-consuming electrode of claim 8 as the cathode.

Another embodiment of the present invention is the above process, wherein the silver salt solution is a silver nitrate solution, the alkaline solution is an aqueous NaOH solution, the metering time is less than 10 min, the suspension is stirred over a period of at most 5 min, the temperature of the suspension is kept within a range from 10° C. to 50° C., and the precipitated silver oxide is removed from step a) from the suspension by once or more than once filtering the suspension and washing the silver oxide.

Another embodiment of the present invention is the above process, wherein the metering time is less than 1 min and the temperature of the suspension is kept within a range from from 25° C. to 30° C.

Another embodiment of the present invention is the above process, wherein the silver oxide after the drying in step c) has a BET surface area in the range from 0.6 to 0.65 m$^2$/g.

Another embodiment of the present invention is the above process, wherein the silver oxide after the drying in step c) has a d50 in the range from 3 to 5 µm.

Another embodiment of the present invention is the above process, wherein, in the further processing step d), 2 to 10 parts by weight of the fluorinated polymer, 2 to 10 parts by weight of silver in the form of silver particles, and 70 to 95 parts by weight of silver oxide in the form of silver oxide particles are used.

Another embodiment of the present invention is the above process, wherein, in the further processing step d), the dry production process is employed by pressing a pulverulent mixture of silver oxide, a catalyst comprising silver particles, and a finely divided fluorinated polymer with an electrically conductive support material to give a flat oxygen-consuming electrode.

Another embodiment of the present invention is the above electrolysis cell, wherein the alkali metal chloride is sodium chloride, potassium chloride, or a mixture thereof.

Another embodiment of the present invention is the above electrolysis cell, wherein the alkali metal chloride is sodium chloride.

DETAILED DESCRIPTION OF THE INVENTION

It has been found that, surprisingly, a silver oxide leading to a lower cell voltage in chloralkali electrolysis is one which has been produced, for example, by the following steps:

(1) precipitating silver oxide by adding a silver salt solution, preferably a silver nitrate solution, to an initial charge of an alkaline solution, especially of an aqueous NaOH solution, the metering time here being preferably less than 10 min, more preferably less than 1 min. Subsequently, the suspension is stirred over a period of at most 10 min, preferably at most 5 min, at a temperature of at most 50° C. and at least 10° C., preferably 25 to 30° C., (2) filtering the suspension and washing the filtercake (this step is repeated twice or more, at least once. After the last wash, the suspension is filtered once again.), (3) drying the silver oxide, in the course of which the silver oxide is first dried at a temperature in the range from 80 to 200° C., preferably at 100 to 120° C., especially over the course of up to 10 h hours, preferably at most 5 h, then the silver oxide is mechanically comminuted in order to disassociate agglomerates, and dried once again, again at a temperature in the range from 80 to 200° C., preferably at 100 to 120° C., over at most 2 h, preferably at most 1 h, and then the silver oxide formed is processed at least with an electrically conductive support material, silver catalyst and a fluorinated polymer to give an OCE.

The invention therefore provides a process for producing an oxygen-consuming electrode, comprising the steps of:

a) precipitating silver oxide by adding a silver salt solution, preferably a silver nitrate solution, to an initial charge of an alkaline solution, especially of an aqueous NaOH solution, the metering time here being preferably less than 10 min, more preferably less than 1 min, then stirring the suspension over a period of at most 10 min, preferably at most 5 min, in the course of which the temperature of the suspension is kept within a range from 10° C. to 50° C., preferably from 25° C. to 30° C., b) removing the precipitated silver oxide from step a) from the suspension, more particularly by once or more than once filtering the suspension and washing the silver oxide, c) drying the silver oxide at a temperature in the range from 80° C. to 200° C., optionally under reduced pressure, d) further processing the resulting silver oxide with an electrically conductive support material, a catalyst comprising silver particles, and a finely divided fluorinated polymer to give a flat oxygen-consuming electrode.

The silver oxide after the drying in step c) preferably has a BET surface area in the range from 0.4 to 0.7 m$^2$/g, especially within a range from 0.6 to 0.65 m$^2$/g.

The silver oxide after the drying in step c) preferably has a d50 in the range from 2 to 7 μm, especially within the range from 3 to 5 μm.

The alkali metal hydroxide in the alkali metal hydroxide solution is preferably used in step a) in a molar excess relative to the silver salt. The ratio is more preferably at least 1.1 to 1.

The invention also provides an oxygen-consuming electrode at least comprising an electrically conductive support, an electrical contact site and a gas diffusion layer comprising a catalytically active component, wherein the gas diffusion layer comprises at least one fluorinated polymer, silver in the form of silver particles and silver oxide in the form of silver oxide particles, produced by the process according to the invention. Here and hereinafter, the d50 means the diameter of a volume-based particle size distribution below which 50% of all measured particles of a particle size distribution lie. Typically, the particle size distribution is measured by means of a laser diffraction spectrometer (e.g. MS 2000 Hydro S). In the course of measurement, the powder is typically in the form of a dispersion in water with addition of a surfactant, e.g. Tween 80. The dispersion operation is typically performed by means of an ultrasound treatment of duration 15 to 300 s.

In addition, here and hereinafter, BET surface area means the specific surface area of a solid, measured to DIN ISO 9277 in $m^2/g$.

A further particularly preferred version of the novel process is characterized in that, in the further processing step d), 0.5 to 20 parts by weight and preferably 2 to 10 parts by weight of the fluorinated polymer, 1 to 20 parts by weight and preferably 2 to 10 parts by weight of silver in the form of silver particles, and 60 to 98.5 parts by weight and preferably 70 to 95 parts by weight of silver oxide in the form of silver oxide particles are used.

Preference is given to using unsupported silver as the catalyst. In the case of OCEs comprising catalysts composed of unsupported metallic silver, there are naturally no stability problems resulting from decomposition of the catalyst support.

In the case of production of OCEs comprising unsupported silver catalyst, the silver is preferably introduced at least partly in the form of silver oxides, which are then reduced to metallic silver. The reduction of the silver compounds also results in a change in the arrangement of the crystals, more particularly also to bridge formation between individual silver particles. This leads to overall consolidation of the structure.

The manufacture of oxygen-consuming electrodes comprising silver catalyst can in principle be divided into wet and dry manufacturing processes.

In the dry processes, a mixture of catalyst and polymeric component (usually PTFE) is ground to fine particles, which are subsequently distributed onto an electrically conductive support element and pressed at room temperature. Such a process is described, for example, in EP 1728896 A2.

In the wet manufacturing processes, either a paste or a suspension consisting of catalyst and polymeric component in water or another liquid is used. In the course of preparation of the suspension, it is possible to add surface-active substances, in order to increase the stability thereof. A paste is subsequently applied to the support by means of screen printing or calendering, while the less viscous suspension is typically sprayed on. The support with the paste or suspension applied is dried and sintered. The sintering is effected at temperatures in the region of the melting point of the polymer. In addition, the OCEs, after the sintering, can also be consolidated at a higher temperature (up to the melting point, softening point or decomposition point of the polymer) than room temperature.

The electrodes produced by these processes are incorporated into the electrolyser without prior reduction of the silver oxides. The silver oxides are reduced to metallic silver after the electrolyser has been filled with the electrolyte, under the action of the electrolysis current.

Various publications describe the preparation of silver oxide based on a precipitation using silver nitrate and sodium hydroxide solution. U.S. Pat. No. 7,771,872B2 describes, for example, the production and use of silver oxide powders for button cells. The process consists here essentially of 4 steps, precipitation while mixing aqueous solutions of silver nitrate and sodium hydroxide solution with a long subsequent stirring period of at least 30 min (in the case of the example with the best performance even 12 h), filtration of this suspension and subsequent drying at high temperature under reduced pressure. The powders thus produced had d50 values between 1 and 500 μm and a BET surface area of less than 5 $m^2/g$. A disadvantage of this production process is an extremely long subsequent stirring period, which considerably prolongs the production times in a production process on the industrial scale. A further disadvantage is that, within such a long subsequent stirring period, individual particles can coalesce, which can lead to particles of high diameter, and these can lead to an inhomogeneous electrode structure in subsequent further processing in, for example, a production process for an OCE, as described in DE10148599.

U.S.20050050990 describes different processes for producing fine silver oxide particles, in which either a dispersant is added during the precipitation, or sodium hydroxide solution and silver nitrate solution for the precipitation are metered simultaneously into an initial charge of sodium hydroxide solution. In these cases, the powders, after the precipitation, filtration and drying, were also subjected to wet grinding. This affords silver oxide particles with a d50 below 3 μm and a d90 below 8 μm, and with a BET surface area above 0.9 $m^2/g$. Both processes mentioned have disadvantages compared to the process described in this patent. In the first process, a dispersant is additionally added, which subsequently has to be removed again; in the second process, the metered addition of the two solutions has to be simultaneous, which corresponds to an increased level of metering complexity. In addition, the wet grinding process also involves a further process step.

In a particularly advantageous version of the invention, the novel process is configured such that, in the further processing step d), the dry production process is employed, more particularly by pressing a pulverulent mixture of silver oxide, a catalyst comprising silver particles, and a finely divided fluorinated polymer with an electrically conductive support material to give a flat oxygen-consuming electrode.

The present invention also provides an oxygen-consuming electrode at least comprising an electrically conductive support, an electrical contact site and a gas diffusion layer comprising a catalytically active component, wherein the gas diffusion layer comprises at least one fluorinated polymer, silver in the form of silver particles and silver oxide in the form of silver oxide particles, produced by the novel process according to the invention as described above.

The coating preferably comprises 0.5 to 20 parts by weight and preferably 2 to 10 parts by weight of the fluorinated polymer, 1 to 20 parts by weight and preferably 2 to 10 parts by weight of silver in the form of silver particles, and 60 to 98.5 parts by weight and preferably 70 to 95 parts by weight of silver oxide in the form of silver oxide particles.

The silver oxide-containing OCE is produced, for example, by the techniques known per se, in the wet or dry production process. These are effected, more particularly, as described above.

The novel oxygen-consuming electrode is preferably connected as a cathode, especially in an electrolysis cell for the electrolysis of alkali metal chlorides, preferably of sodium chloride or potassium chloride, more preferably of sodium chloride. The invention consequently also provides an electrolysis apparatus, especially for chloralkali electrolysis, comprising a novel above-described oxygen-consuming electrode as the oxygen-consuming cathode.

Alternatively, the oxygen-consuming electrode can preferably be connected as a cathode in a fuel cell.

The invention therefore further provides for the use of the novel oxygen-consuming electrode for reduction of oxygen under alkaline conditions used are, especially in an alkaline fuel cell, for use in drinking water treatment, for example for preparation of sodium hypochlorite or for use in chloralkali electrolysis, especially for electrolysis of LiCl, KCl or NaCl.

The novel OCE is more preferably used in chloralkali electrolysis and here especially in sodium chloride (NaCl) electrolysis.

The invention therefore further also provides an electrolysis cell for the electrolysis of alkali metal chlorides, preferably of sodium chloride or potassium chloride, more preferably of sodium chloride, characterized in that it comprises an inventive oxygen-consuming electrode as described above as the cathode.

The invention is illustrated in detail hereinafter by the examples, but these do not constitute a restriction of the invention.

All the references described above are incorporated by reference in their entireties for all useful purposes.

While there is shown and described certain specific structures embodying the invention, it will be manifest to those skilled in the art that various modifications and rearrangements of the parts may be made without departing from the spirit and scope of the underlying inventive concept and that the same is not limited to the particular forms herein shown and described.

EXAMPLES

Example 1

160 g of NaOH are dissolved in deionized water and diluted to give 1.3 l of sodium hydroxide solution. Subsequently, 499 g of silver nitrate (AGFA, technical grade, bagged product) are likewise dissolved with deionized water and diluted to 1.3 l of silver nitrate solution. A 5 l beaker we initially charged at room temperature with the sodium hydroxide solution while stirring (paddle stirrer, VA stirrer blade, 150 rpm) and the silver nitrate solution added within 20 s at a stirrer speed of 250 rpm, This is followed by stirring for a further 5 min.

The suspension is subsequently filtered through a whiteband filter on a porcelain suction filter for 10 min. The filtercake is washed five times more with half a litre each time of deionized water on the suction filter. Thereafter, the entire filtercake is slurried in 3 l of deionized water, filtered on a new white-band filter and washed three times with half a litre each time of deionized water on the suction filter.

The filtercake is dried in a vacuum drying cabinet at 120° C. for 5 h. Subsequently, larger agglomerates are mechanically destroyed (crushed) and the filtercake is dried once again in a vacuum drying cabinet at 120° C. for 1 h.

For the silver(I) oxide thus prepared, by means of BET measurement, a specific BET surface area of 0.63 $m^2/g$ was measured. Through the determination of a particle size distribution by means of laser diffraction in an MS 2000 Hydro S, after an ultrasound pretreatment in a water/Tween 80 mixture of the silver(I) oxide sample for 300 s, a d50 of 3.97 μm was found for this silver(I) oxide.

0.16 kg of a powder mixture consisting of 7% by weight of PTFE powder of the Dyneon TF2053Z type, 86% by weight of silver(I) oxide, prepared by the above preparation process, and 7% by weight of silver powder of the Ferro 331 type were mixed 4 times in an IKA mixer, for 15 s each time. The temperature of the powder mixture remained below 50° C. during the operation. After the mixing, the powder mixture was sieved with a mesh size of 1.0 mm.

The sieved powder mixture was subsequently applied to a mesh of nickel wire with a wire thickness of 0.14 mm and a mesh size of 0.5 mm. The application was effected with a template of thickness 2 mm, and the powder was applied with a sieve having a mesh size of 1 mm. Excess powder which projected over the thickness of the template was removed by means of a skimmer. After removal of the template, the support with the powder mixture applied was pressed by means of a roller press with a pressing force of 0.26 kN/cm. The oxygen-consuming electrode was removed from the roller press.

The oxygen-consuming electrode thus produced was used in the electrolysis of a sodium chloride solution (concentration of 210 g/l) with a DuPONT N982WX ion exchange membrane and a 3 mm gap containing sodium hydroxide solution between OCE and membrane. The electrolyte temperature was 90° C.; the sodium hydroxide solution concentration was 32% by weight. The oxygen with a purity of 99.5% was metered in on the side of the OCE facing away from the gap containing sodium hydroxide solution. The anode used was expanded titanium metal coated with ruthenium-containing mixed noble metal oxide (manufacturer: De Nora, LZM type). The active electrode base areas and the membrane base area were each 100 $cm^2$. The sodium hydroxide solution flow and the brine flow were each between 5 and 10 l/h, and the oxygen flow was between 45 and 55 l/h.

At a current density of 4 $kA/m^2$, a cell voltage of 2.02 V was measured.

The invention claimed is:

1. A process for producing an oxygen-consuming electrode, comprising the steps of:
   a) precipitating silver oxide by metering a silver salt solution to an initial charge of an alkaline solution to form a suspension and then stirring the suspension over a period of at most 10 minutes, in the course of which the temperature of the suspension is kept within a range from 10 ° C. to 50 ° C.,
   b) removing the precipitated silver oxide from step a) from the suspension,
   c) drying the silver oxide at a temperature in the range from 80 ° C. to 200 ° C.,
   d) further processing the resulting silver oxide with an electrically conductive support material, a catalyst comprising silver particles, and a finely divided fluorinated polymer to give a flat oxygen-consuming electrode.

2. The process of claim 1, wherein the silver oxide after the drying in step c) has a d50 in the range from 2 to 7 μm.

3. The process of claim 2, wherein the silver oxide after the drying in step c) has a d50 in the range from 3 to 5 μm.

4. The process of claim 1, wherein, in the further processing step d), a dry process is employed.

5. The process of claim 4, wherein, in the further processing step d), the dry production process comprises pressing a pulverulent mixture of silver oxide, a catalyst comprising silver particles, and a finely divided fluorinated polymer with an electrically conductive support material to give a flat oxygen-consuming electrode.

6. The process of claim 1, wherein the silver salt solution is a silver nitrate solution, the alkaline solution is an aqueous NaOH solution, the metering time is less than 10 minutes, the suspension is stirred over a period of at most 5 minutes, the temperature of the suspension is kept within a range from 10° C. to 50° C., and the precipitated silver oxide is removed from step a) from the suspension by once or more than once filtering the suspension and washing the silver oxide.

7. The process of claim 6, wherein the metering time is less than 1 min and the temperature of the suspension is kept within a range from 25° C. to 30° C.

8. An oxygen-consuming electrode comprising an electrically conductive support, an electrical contact site, and a gas diffusion layer comprising a catalytically active component, wherein the gas diffusion layer comprises 0.5 to 20 parts by weight of at least one fluorinated polymer, 1 to 20 parts by weight of silver in the form of silver particles and 60 to 98.5 parts by weight of silver oxide in the form of silver oxide particles.

9. The oxygen-consuming electrode of claim 8, wherein the oxygen-consuming electrode comprises silver oxide particles having a d90 of less than 13 μm.

10. An electrolysis cell for the electrolysis of an alkali metal chloride wherein the electrolysis cell comprises the oxygen-consuming electrode of claim 8 as the cathode.

11. The electrolysis cell of claim 10, wherein the alkali metal chloride is sodium chloride, potassium chloride, or a mixture thereof.

12. The electrolysis cell of claim 11, wherein the alkali metal chloride is sodium chloride.

13. A process for producing an oxygen-consuming electrode, comprising the steps of:
a) precipitating silver oxide by metering a silver salt solution to an initial charge of an alkaline solution to form a suspension and then stirring the suspension over a period of at most 10 minutes, in the course of which the temperature of the suspension is kept within a range from 10 ° C. to 50 ° C.,
b) removing silver oxide precipitated from step a) from the suspension,
c) drying the silver oxide at a temperature in the range from 80 ° C. to 200 ° C., wherein the silver oxide after drying has a BET surface area in the range from 0.4 to 0.7 m$^2$/g, and
d) further processing the resulting silver oxide with an electrically conductive support material, a catalyst comprising silver particles, and a finely divided fluorinated polymer to give a flat oxygen-consuming electrode.

14. The process of claim 13, wherein the silver oxide after the drying in step c) has a BET surface area in the range from 0.6 to 0.65 m$^2$/g.

15. A process for producing an oxygen-consuming electrode, comprising the steps of:
a) precipitating silver oxide by metering a silver salt solution to an initial charge of an alkaline solution to form a suspension and then stirring the suspension over a period of at most 10 minutes, in the course of which the temperature of the suspension is kept within a range from 10 ° C. to 50 ° C.,
b) removing silver oxide precipitated from step a) from the suspension,
c) drying the silver oxide at a temperature in the range from 80 ° C. to 200° C., and
d) further processing 60 to 98.5 parts by weight of the resulting silver oxide with an electrically conductive support material, a catalyst comprising 1 to 20 parts by weight of silver in the form of silver particles, and 0.5 to 20 parts by weight of a finely divided fluorinated polymer to give a flat oxygen-consuming electrode.

16. The process of claim 15, wherein, in the further processing step d), 2 to 10 parts by weight of the fluorinated polymer, 2 to 10 parts by weight of silver in the form of silver particles, and 70 to 95 parts by weight of silver oxide in the form of silver oxide particles are used.

17. A process for producing an oxygen-consuming electrode, comprising the steps of:
a) precipitating silver oxide by metering a silver salt solution to an initial charge of an alkali metal hydroxide solution in which the alkali metal hydroxide solution is in a molar excess relative to the silver salt in the silver salt solution to form a suspension, and then stirring the suspension over a period of at most 10 minutes, in the course of which the temperature of the suspension is kept within a range from 10 ° C. to 50 ° C.,
b) removing silver oxide precipitated from step a) from the suspension,
c) drying the silver oxide at a temperature in the range from 80 ° C. to 200 ° C., and
d) further processing the resulting silver oxide with an electrically conductive support material, a catalyst comprising silver particles, and a finely divided fluorinated polymer to give a flat oxygen-consuming electrode.

18. The process of claim 17, wherein the ratio of alkali metal hydroxide in the alkali metal hydroxide solution in a molar excess relative to the silver salt is at least 1.1 to 1.

* * * * *